(12) United States Patent
Ebner

(10) Patent No.: US 8,902,197 B2
(45) Date of Patent: Dec. 2, 2014

(54) DISPLAY SURFACE AND CONTROL DEVICE COMBINED THEREWITH FOR A DATA PROCESSING SYSTEM

(75) Inventor: Richard Ebner, Wels (AT)

(73) Assignee: Isiqiri Interface Technologies GmbH (AT)

( * ) Notice: Subject to any disclaimer, the term of this patent is extended or adjusted under 35 U.S.C. 154(b) by 166 days.

(21) Appl. No.: 13/264,700

(22) PCT Filed: Apr. 15, 2010

(86) PCT No.: PCT/AT2010/000109
§ 371 (c)(1),
(2), (4) Date: Oct. 14, 2011

(87) PCT Pub. No.: WO2010/118450
PCT Pub. Date: Oct. 21, 2010

(65) Prior Publication Data
US 2012/0113003 A1  May 10, 2012

(30) Foreign Application Priority Data

Apr. 16, 2009  (AT) ..................... 587/2009

(51) Int. Cl.
| | | |
|---|---|---|
| *G06F 3/042* | (2006.01) | |
| *G09G 5/00* | (2006.01) | |
| *G06F 3/041* | (2006.01) | |
| *G06F 3/033* | (2013.01) | |
| *G09G 3/28* | (2013.01) | |
| *G06F 3/045* | (2006.01) | |
| *G06K 11/06* | (2006.01) | |
| *G06F 3/038* | (2013.01) | |

(52) U.S. Cl.
CPC .............. *G06F 3/0386* (2013.01); *G06F 3/042* (2013.01)
USPC ........... 345/175; 345/156; 345/173; 345/179; 345/182; 178/18.09; 178/19.05

(58) Field of Classification Search
USPC ................................. 345/156, 157, 173–183; 178/18.01–20.04
See application file for complete search history.

(56) References Cited

U.S. PATENT DOCUMENTS

| | | | |
|---|---|---|---|
| 6,034,765 A | 3/2000 | Flassayer | |
| 7,499,027 B2 * | 3/2009 | Brigham et al. | 345/158 |

(Continued)

FOREIGN PATENT DOCUMENTS

| | | |
|---|---|---|
| DE | 3413372 A1 | 10/1985 |
| DE | 3511757 A1 | 10/1986 |

(Continued)

OTHER PUBLICATIONS

International Search Report for PCT/AT2010/000109, English translation attached to original, Both completed by the European Patent Office on Aug. 12, 2010, All together 9 Pages.

*Primary Examiner* — Ilana Spar
(74) *Attorney, Agent, or Firm* — Brooks Kushman P.C.

(57) ABSTRACT

A combined display surface and a control device for a data processing system, wherein the position of a light beam hitting the display surface is measured and the measured result is used by the data processing system as a basis for determining a cursor position on the display surface. Several strip-shaped optical position detectors are arranged along the edge of the display surface, the measured signals of which are fed into the data processing system. The cross-sectional shape of the indicator beam is formed by several lines which protrude both the display surface and the position detectors arranged thereon. The optical position detectors are formed by a layered structure made of organic material.

5 Claims, 3 Drawing Sheets

(56) References Cited

U.S. PATENT DOCUMENTS

Figure 1:
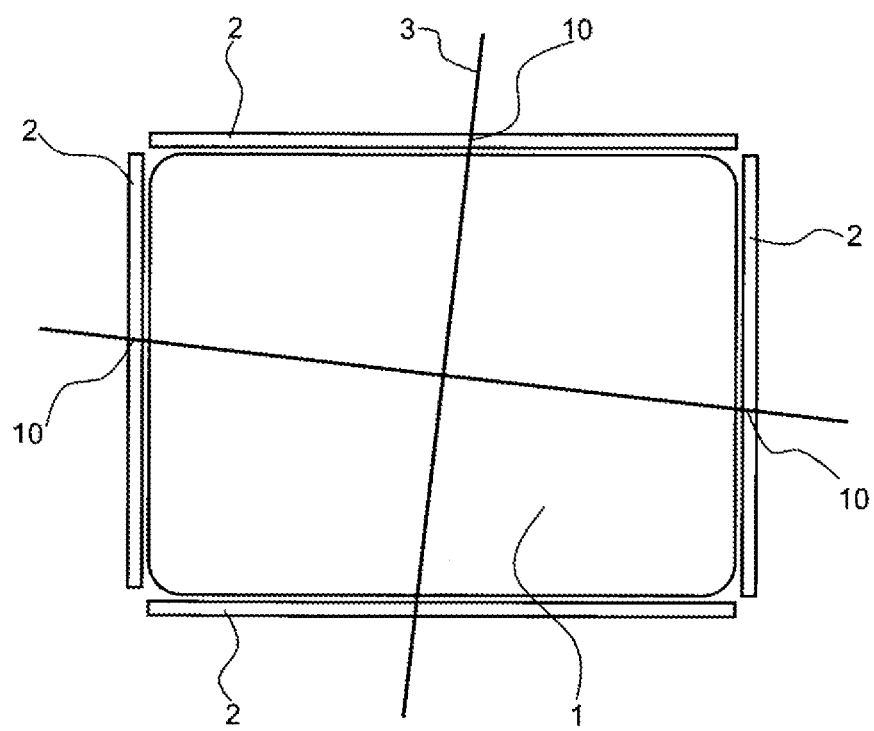

| | | | |
|---|---|---|---|
| 7,692,639 B2 * | 4/2010 | Silverstein et al. | 345/179 |
| 2003/0180692 A1 | 9/2003 | Skala et al. | |
| 2004/0178325 A1 | 9/2004 | Forrest et al. | |
| 2005/0103924 A1 * | 5/2005 | Skala et al. | 244/3.13 |
| 2007/0125937 A1 | 6/2007 | Eliasson et al. | |
| 2007/0176165 A1 * | 8/2007 | Forrest et al. | 257/40 |
| 2011/0006985 A1 | 1/2011 | Koeppe | |
| 2011/0115750 A1 | 5/2011 | Ebner et al. | |
| 2011/0266423 A1 | 11/2011 | Koeppe et al. | |

FOREIGN PATENT DOCUMENTS

| | | |
|---|---|---|
| EP | 0225625 A2 | 6/1987 |
| EP | 0354996 A2 | 2/1990 |
| EP | 1696300 A1 | 8/2006 |
| WO | 2007038193 A2 | 4/2007 |
| WO | 2007063448 A2 | 6/2007 |
| WO | WO 2008018768 A1 * | 2/2008 |
| WO | 2009105801 A1 | 9/2009 |
| WO | 2010006348 A1 | 1/2010 |
| WO | 2010078609 A1 | 7/2010 |

* cited by examiner

DISPLAY SURFACE AND CONTROL DEVICE COMBINED THEREWITH FOR A DATA PROCESSING SYSTEM

CROSS-REFERENCE TO RELATED APPLICATION

This application is the U.S. national phase of PCT Appln. No. PCT/AT2010/000109 filed Apr. 15, 2010 which claims priority to Austrian application A 587/2009 filed Apr. 16, 2009, the disclosures of which are incorporated in their entirety by reference herein.

EP 1 696 300 A1 for example, describes a so-called optical Joystick. A pivotably mounted lever is provided with a light source at one end, which light source, depending on the position of the lever, emits light onto a specific region of a surface provided with an array of light-sensitive cells. Usually, the electrical signals thereby generated at the cells are read in by a computer and interpreted such that the Joystick, from the point of view of the user, has the same effects on the computer as a Joystick in which the position is picked off via non-reactive resistors. Typically, the Joystick is used to move a cursor symbol on the screen of the computer. Depending on what function is assigned to what location of the screen, if the cursor is situated there, a specific action can then be initiated by actuating a switch or the enter key. The light-sensitive cells toward which light is emitted from the lever of the cursor are normally not seen by the operating person. Given a corresponding design, a small area of light-sensitive cells is sufficient.

US 2007/0176165 A1 discloses a design for a position detector based on light-sensitive organic semiconductors for an impinging light spot. The detector, having a planar construction, consists of a plurality of layers. A first, planar electrode, having a high non-reactive resistance, extends on a substrate composed of glass or a flexible organic material. Said electrode is followed by a layer composed of organic photoactive materials, within which a donor layer and an acceptor layer are adjacent to one another. This is in turn followed by a planar electrode, which, however, has a low non-reactive resistance. At the edge thereof, the photoactive materials are provided with two to 8 point- or line-like connection electrodes spaced apart from one another. If a concentrated light beam with an appropriate wave spectrum impinges on a point of the layer composed of photoactive materials, then a current flows through the individual connection electrodes. From the magnitude of the current in the individual connection electrodes, it is possible to calculate back the impingement point of the light beam through a kind of triangulation.

In accordance with WO 2007/063448 A2 the position of a luminous pointer with respect to a screen is determined by means of a plurality of photodiodes arranged alongside the screen. In this case, the pointing beam is fanned out very widely, and its light intensity decreases from its center. From the knowledge of the intensity distribution over the cross-sectional area of the light beam, after the measurement of the intensity at the individual detectors, the distance to the cross-sectional center of the beam and thus to the point at which this beam center impinges on the display surface is calculated back. The position accuracy that can be achieved is relatively limited particularly in the case of a change in the location of the pointing device emitting the pointing beam.

US 2005/0103924 A1 describes a shooting training device using a computer. The aiming device emits an infrared laser beam having a cross-shaped cross-sectional area onto a screen connected to a computer. The edge of the screen is bordered by a series of photodiodes by means of which the computer detects the the position of the cross-sectional area of the laser beam. As a "shot", the laser beam is briefly switched off by the aiming device. The computer thereupon indicates the crossing point of the bars of the cross-sectional area of the laser beam before this interruption on the screen.

The inventor has addressed the problem of providing a display surface and a control device combined therefore for a data processing system, wherein, on a display surface with the aid of a pointing beam emitted by a luminous device, a cursor for the purpose of inputting to a data processing system can be controlled. By comparison with the design in accordance with WO 2007/063448 A2, the cursor position in intended to be more precisely controllable and the function of the device is intended to be less dependent on where the pointer device emitting the luminous pointer is spatially relative to the display surface. By comparison with the design in accordance with US 2005/0103924 A1 cost savings are intended to be made possible without any loss of accuracy.

In order to solve the problem it is proposed, as in the case of US 2005/0103924 A1, to use a pointing beam whose cross-sectional area projects beyond the display surface and consists of a plurality of lines, and furthermore to fit at the edge of the display surface optical sensors, from the measured signals of which the data processing system calculates the position of the pointing beam. As a crucial improvement it is proposed to arrange, along the edge of the display surface, a plurality of strip-type optical position detectors formed by a layered structure composed of an organic material, in which electrical signals are generated in a manner dependent on absorbed light, wherein the layered structure has a plurality of tapping points for the generated signals, wherein the magnitude of the signals at the individual tapping points is dependent on the distance thereof from the partial areas at which the light is absorbed, and wherein the distance ratios of the respective tapping points with respect to those partial areas at which the light is absorbed can be calculated from the magnitude ratios between the signals at a plurality of tapping points.

By not using purely individual photodiodes, but rather a continuous photosensitive layered structure, wherein the impingement points of light on the layered structure are calculated back from the ratios of magnitudes of signals picked off at a plurality of tapping points, the hardware costs both for the optical detector and for the downstream interface electronics are greatly reduced compared with the previously known design.

In one advantageous embodiment a position detector is constructed as a strip-type, planar optical waveguide to which a small number of "conventional" photoelectric sensors, typically silicon photodiodes, are fitted at a distance from one another, the position of a light spot impinging on the control surface being deduced from the measured signals of said sensors. In this case, at least one layer of the planar optical waveguide has photoluminescent properties. This structure is robust, cost-effective, independent of the angle of incidence of the pointing beam in a wide range and, moreover, can readily be set for selective detection of a narrow spectral range.

A further advantageous embodiment of the position detector has similar advantages. In this case, the position detector has a layer composed of an organic photoactive material which layer is connected on both sides by a planar electrode, wherein one of the two electrodes has a relatively high non-reactive resistance within its electric circuit, wherein the current through this poorly conducting electrode is measured at a plurality of mutually spaced-apart connection points and the position of a local conductive connection through the photosensitive layer brought about by light absorption is calculated from the relative magnitude of the different currents measured at the different connection points with respect to one another.

In a highly advantageous embodiment, different cross-sectional area regions of the pointing beam are coded differently; typically, the light intensity of differently oriented lines of the cross-sectional area of the pointing beam can fluctuate with different frequencies. This makes it possible to identify from the signals measured at the optical detectors for the data processing system not only the position of the pointing beam but also the angular position of the pointing beam about its longitudinal axis in a measurement range of up to 360°. Therefore, for the inputting to a computer by means of a cursor, not just two linear dimensions of the position of the cursor are available, but additionally also an angular dimension of the cursor.

Since the cross-sectional dimensions of the pointing beam are very large and run as intended beyond the display surface, the cross-sectional area regions of the pointing beam which serve for the position measurement of the pointing beam at the display surface are preferably emitted in a spectral range not visible to the human eye—more preferably in the infrared range for cost reasons. In one advantageous further development in this regard, in the center of this pointing beam, an additional pointing beam having smaller cross-sectional dimensions is concomitantly emitted in the visible spectral range, the position of which additional pointing beam on the display surface, given proper functioning of all the components, coincides with the cursor position to be calculated by the data processing system. The position of this second pointing beam need not be detectable by technical optical sensors. Said second pointing beam serves only for showing the position of the pointing beam directly to the user, independently of what state the data processing system is currently in and whether the display surface is being pointed at in any way at all.

The structure of position detectors used according to the invention is schematically depicted by way of example and in a simplified manner in the drawings:

FIG. 1: shows an exemplary display surface according to the invention in a frontal view.

Figure 2:
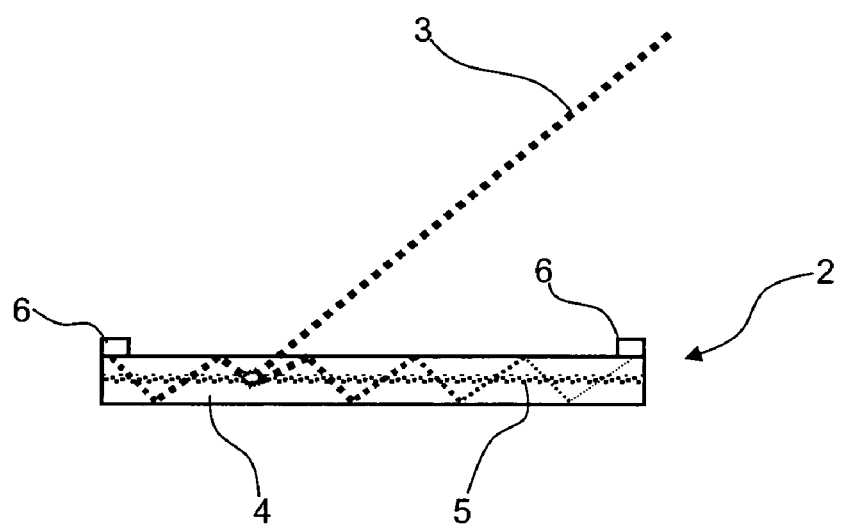

FIG. 2: shows a position detector from FIG. 1 in side view. For reasons of visibility, the layer thicknesses are in this case illustrated in a disproportionately enlarged fashion.

Figure 3:
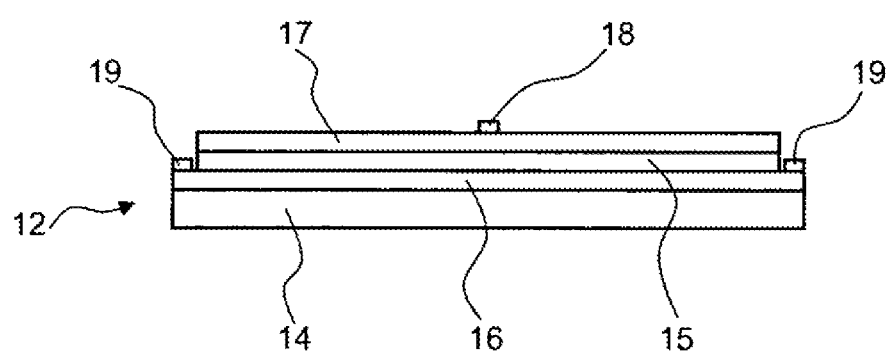

FIG. 3: shows a second exemplary embodiment of a position detector that can be used for the structure according to the invention, in side view. For reasons of visibility, the layer thicknesses are in this case illustrated in a disproportionately enlarged fashion.

At the four side lines of the approximately rectangular display surface 1 in accordance with FIG. 1, optical position detectors 2 are fitted parallel to the side lines, said position detectors each having the form of a narrow strip and being able to detect, with respect to their longitudinal direction, the position of a light spot impinging on them. The pointing beam 3 is visible in cross-sectional view in FIG. 1. In this example, the cross-sectional form of the pointing beam 3 is formed by two mutually perpendicular lines crossing one another. The position of the intersection points 10 of these lines at the individual position detectors 2 is forwarded from the individual position detectors to the data processing system to be controlled. The data processing system can calculate the position of the intersection point of the two cross-sectional lines of the pointing beam 3 on the display surface as the point of intersection of those two straight lines which respectively connect the two intersection points 10 at two identically oriented position detectors. These coordinates can be assigned, by the operating system running on the data processing system, the position of a cursor, that is to say of an insertion mark, writing mark or input marking that is otherwise usually moved by means of a "mouse" on the display surface.

For the position determination of the pointing beam, the light intensity of that part of the pointing beam which impinges at the individual position detectors is not of importance, rather only the coordinate of the impingement point at the position detectors in the longitudinal direction thereof is of importance. Therefore, the measurement accuracy becomes independent—in a wide range—of the distance of the pointing device emitting the pointing beam.

Since the cross-sectional dimensions of the pointing beam decrease with decreasing distance from the pointing device, the correct function is provided only when the pointing device is not arranged too close to the display surface, since then all the position detectors are no longer hit by the luminous pointer. However, this restriction can readily be controlled by the pointing beam being expanded to a correspondingly great extent.

By virtue of the fact that the cross-sectional form of the pointing beam is formed by two straight lines crossing one another and the crossing point of these lines is taken as the point which defines the cursor position on the display surface, the measurement is also independent of the direction from which the pointing beam impinges on the position detectors, as long as it impinges only from the front side.

In the exemplary embodiment of a position detector 2 as depicted schematically in FIG. 2, said position detector consists of a strip having a width of a few millimeters. Between two approximately 0.1 mm thick covering layers 4 composed of PET, an approximately 0.001 mm thick layer 5 composed of a homogeneous mixture of the plastic polyvinyl alcohol and the dye rhodamine 6G is laminated. The PET layers 4 together with the layer 5 lying therebetween form an optical waveguide. The layer 5 is photoluminescent. At both ends of the position detector 2, a respective silicon photodiode is arranged as a photoelectric sensor 6, which photodiode can have a cross-sectional area of 2×2 mm$^2$, for example. The photodiodes are fitted at the exposed side of one of the two PET layers 4 in such a way that they couple out light from the PET layer and couple it in at their pn junction thereof. The signals of all the photodiodes are fed via electrical lines and possibly a frequency filter to the data processing system, in which they are measured and processed.

If a light spot having an appropriate spectrum impinges on the layer 5, it triggers luminescence in the integrated particles. The longer-wave light arising in this case is largely coupled into the waveguide formed by the layers 4 and 5. The light in the waveguide mode is attenuated by the distribution and damping in the waveguide. Consequently, a different intensity of the light in the waveguide mode is measured at the photoelectric sensors 6 depending on the distance between the impingement point of the luminescence-generating light and the photoelectric sensor. By comparing the signals at the different sensors, it is possible to deduce the position of the impingement point. In this case, the absolute magnitude of the individual signals is insignificant; only their magnitude ratio with respect to one another is important. For the purpose of increasing the possible position resolution, more than two photoelectric sensors 6 can be fitted per detector. The possible resolution is in any case many times finer than the distance between two photoelectric sensors 6.

In accordance with FIG. 3, a further exemplary strip-type position detector 16 is shown in side view. On an electrically insulating, light-transmissive substrate 14, which is, for example, a plastic film, there is arranged as a transparent or semitransparent planar electrode 16, which "is poorly conducting", that is to say, although it consists of an electrically conductive material, it represents an appreciable non-reactive resistance within the system. This "poorly conductive electrode" can be a very thin metal layer, a transparent conductive oxide (TCO), a conductive polymer, or it can be a carbon nanotube network. The layer thickness of said electrode is dimensioned such that its sheet resistance in the event of current flow causes a significant voltage drop in the respective electric circuit. Two connection points 19 arranged at the opposite ends of the position detector constitute the connection of the poorly conductive electrode 16 to an external electric circuit.

The layer which is adjacent to the "poorly conductive electrode" 16 and is conductively connected thereto is a photoactive organic semiconductor layer 15. This layer can be a photoconductor or a photovoltaically active element. That is to say, upon absorption of light, its electrical resistance can collapse, or an electrical voltage can be generated between two interfaces of the layer. In the first case, a current can flow when an external voltage is present; in the second case, a current can flow by the electric circuit being closed by means of an external loop.

The second side of the photoactive organic semiconductor layer 15 is followed by a planar electrode 17 conductively connected thereto, which electrode ideally has a very low non-reactive resistance in comparison with the other components of the electric circuit. It can be formed by a metal layer, a conductive polymer, a conductive oxide or else by a carbon nanotube network. If the electrode 17 consists of the same material as the electrode 16, then it should have substantially greater thickness than electrode 16. The conductivity of the electrode 17 can be supported by wires or films composed of a highly electrically conductive metal which are adjacent thereto and are conductively connected thereto. The electrode 17 can be connected to an external electric circuit via a connection point 18.

If a concentrated light beam with an appropriate wave spectrum impinges on a point of the photoactive organic semiconductor layer 15, then a current flows through the poorly conductive electrode 16 to the connection points 19. On account of the non-reactive resistance of the electrode 16, the magnitude of the current at the individual connection points 19 is greatly dependent on their proximity thereof to the impingement point of the light beam. As a result, by measuring the individual currents, the impingement point of the light beam can be calculated back from their magnitude ratio with respect to one another. For the purpose of increasing the possible position resolution, more than two connection points 19 can be fitted. The possible resolution is in any case many times finer than the distance between two connection points 19.

The problem that ambient light must not be interpreted incorrectly as the impingement point of the luminous pointer for ascertaining the cursor should be taken into account. This can be done essentially by means of three methods:

the spectral range of the light which the detectors perceive and in which the luminous pointer operates being different than that of the light arriving from the surroundings, or of the light serving for display.

The light beam of the luminous pointer is frequency-coded, i.e. its intensity fluctuates temporally with a specific frequency. This frequency is filtered out by means appertaining to telecommunications technology from the signals supplied by the position detectors.

The light from the luminous pointer has, in a very narrow spectral range, a significantly higher spectral power density than otherwise occurs. The position detectors firstly select as far as possible exactly this spectral range and, in the context of the signals detected in this case, only those whose intensity lies above a certain limit level permitted as characteristic of the cursor position.

By means of frequency coding of pointing beams, not only is it possible to distinguish between individual cross-sectional regions of a pointing beam, but it is also possible to distinguish between a plurality of differently coded pointing beams. In combination with read-out electronics comprising frequency filters (lock-in technique), it is thus also possible to simultaneously track a plurality of pointing beams having different frequencies.

Besides frequency coding there are, of course, further coding possibilities. By way of example, different pointing beams or partial cross-sectional areas thereof within a common temporal clock interval can be assigned a different partial interval in which nothing else is permitted to emit radiation.

The invention claimed is:

1. A control device for a data processing system and display surface combined therewith, comprising:
    a display surface;
    a plurality of one-dimensional optical position detectors that are arranged along the edge of the display surface, each of said optical position detectors generates electrical signals in a manner dependent on absorbed light and is formed by a layered structure composed of an organic material, said optical detectors being equipped with a plurality of tapping points for the signals generated in which the magnitude of the signals at the individual tapping points is dependent on the distance thereof from the partial areas at which the light is absorbed, wherein the distance ratios of the respective tapping points with respect to those partial areas at which the light is absorbed can be calculated from the magnitude ratios between the signals at a plurality of tapping points, wherein the optical position detectors along the edge of the display surface are each constructed as one-dimensional elongate optical waveguides to which more than two photoelectric sensors are fitted, the position of a light spot impinging on the detector surface being deduced from the measured signals of said photoelectric sensors, and at least one layer of each elongate optical waveguide has photoluminescent properties;
    an optical pointer configured to transmit a pointing beam that has a cross-sectional shape of a plurality of lines, wherein the lines of the pointing beam project onto the display surface and outside a surface area of the display surface to directly impinge the optical position detectors that are arranged along the edge of the display surface; and
    a data processing system that uses the measured signals of said optical position detectors to calculate the center point of said pointing beam on the display surface.

2. A control device as claimed in claim 1, wherein a position detector is constructed as an elongate planar position detector on the basis of a layer composed of an organic photoactive material, which layer is connected on both sides by a planar electrode, in which the material of one planar electrode has a relatively higher non-reactive resistance than the material of the other planar electrode, in which the current through this poorly conducting electrode is measured at a plurality of mutually spaced-apart connection points and the position of a local conductive connection through the photosensitive layer brought about by light absorption is calculated from the relative magnitude of the different currents measured at the different connection points with respect to one another.

3. A control device as claimed in claim 1, wherein different cross-sectional area regions of the pointing beam are formed by radiations with different coding features.

4. A control device as claimed in claim 1, wherein the spectrum of the pointing beam detectable by the position detectors lies in a spectral range not visible to the human eye, and the pointing device that emits said pointing beam can emit simultaneously with the pointing beam an additional beam, the color spectrum of which lies in the visible spectral range and the beam cross-sectional area of said additional beam has smaller dimensions than that those of the pointing beam detectable by the position detectors.

5. A system for determining a position of an optical beam transmitted from an optical pointing device, the system comprising:

- a plurality of one-dimensional optical position detectors configured to be arranged about edges of a display surface, the detectors comprising a layered structure composed of an organic material which generates electrical signals in response to absorbed light from an optical beam, each detector including more than two tapping points configured to sense the electrical signals in the organic materials, wherein the magnitude of the electrical signals sensed at the tapping points depends upon a point of impingement of light on the respective detector;
- an optical pointer configured to transmit an optical beam in the shape of intersecting lines such that the optical beam directly impinges each of the optical position detectors about the edges of the display surface; and
- a data processing system configured to determine an intersecting point of the intersecting lines of the optical beam based upon the magnitude of the electrical signals at each optical position detector.

* * * * *